(12) United States Patent
Jeon

(10) Patent No.: US 9,495,448 B2
(45) Date of Patent: Nov. 15, 2016

(54) APPARATUS AND METHOD OF GENERATING COMBINED PROFILE

(75) Inventor: Paul Barom Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 12/853,630

(22) Filed: Aug. 10, 2010

(65) Prior Publication Data

US 2011/0179144 A1 Jul. 21, 2011

(30) Foreign Application Priority Data

Jan. 21, 2010 (KR) .................. 10-2010-0005631

(51) Int. Cl.
*G06F 13/00* (2006.01)
*G06F 17/30* (2006.01)

(52) U.S. Cl.
CPC ... *G06F 17/30766* (2013.01); *G06F 17/30828* (2013.01); *G06F 17/30867* (2013.01)

(58) Field of Classification Search
CPC .................. G06F 17/30766; G06F 17/30867; G06F 17/30828
USPC ................ 709/203, 223, 224, 231, 217–222; 715/744, 745, 747
See application file for complete search history.

(56) References Cited

U.S. PATENT DOCUMENTS

| | | | |
|---|---|---|---|
| 7,809,826 B1 * | 10/2010 | Guruswamy | 709/224 |
| 2002/0124050 A1 * | 9/2002 | Middeljans | 709/203 |
| 2005/0108399 A1 * | 5/2005 | Bouknight et al. | 709/224 |
| 2010/0205211 A1 * | 8/2010 | Ghosh | 707/772 |

FOREIGN PATENT DOCUMENTS

| | | |
|---|---|---|
| JP | 2005-209082 | 8/2005 |
| KR | 10-2007-0120122 | 12/2007 |
| KR | 10-2008-0041971 | 5/2008 |
| KR | 10-2009-0037061 | 4/2009 |
| KR | 10-2009-0076104 | 7/2009 |
| KR | 10-2009-0083730 | 8/2009 |
| KR | 10-2009-0114891 A | 11/2009 |

OTHER PUBLICATIONS

Korean Office Action issued on Dec. 11, 2015 in counterpart Korean Patent Application No. 10-2010-0005631 (5 pages in English; 5 pages in Korean).

* cited by examiner

*Primary Examiner* — Kenneth R Coulter
(74) *Attorney, Agent, or Firm* — NSIP Law

(57) ABSTRACT

A method of generating a combined profile of a terminal, and an apparatus to perform the method, the method including collecting a profile of one or more content playback devices connected to the terminal, and generating a combined profile of the terminal according to a profile of the terminal and the collected profile of the one or more content playback devices.

14 Claims, 4 Drawing Sheets

APPARATUS AND METHOD OF GENERATING COMBINED PROFILE

CROSS-REFERENCE TO RELATED APPLICATION

This application claims the benefit under 35 U.S.C. §119(a) of Korean Patent Application No. 10-2010-0005631, filed on Jan. 21, 2010, in the Korean Intellectual Property Office, the disclosure of which is incorporated herein by reference in its entirety.

BACKGROUND

1. Field

The following description relates to an apparatus and method of generating a combined profile, and more particularly, to an apparatus and method of generating a combined profile regarding a profile of a terminal and profiles of content playback devices around the terminal under a network environment.

2. Description of the Related Art

Recent developments in information communication technologies have enabled downloading of content by accessing a content providing server through the Internet using a terminal, such as a notebook computer, a personal computer (PC), a Personal Digital Assistant (PDA), a smart phone, and the like, so that a user of the terminal may receive the content.

In this instance, the content providing server may provide only contents adaptable to features of the terminal. The content providing server may create content based on profiles regarding features of the terminal, and may provide the created content.

A variety of methods have been actively studied to describe the profiles regarding the features of the terminal. For example, Composite Capabilities/Preference Profile (CC/PP), User Agent Profile (UAProf), and Wireless Universal Resource FiLe (WURFL) standards may be used to describe the profiles.

CC/PP, created by the World Wide Web Consortium (W3C), may be used to manage information regarding device capabilities and user preferences. CC/PP is based on a Resource Description Framework (RDF), and is described in the Extensible Markup Language (XML) format. CC/PP includes components such as hardware, software, networks, and the like, and attributes of each component. Each of the attributes may consist of a name and a value, and may have a default value. Accordingly, CC/PP may specify details of features of each component.

Terms used to describe the CC/PP may be defined by a Uniform Resource Identifier (URI) in the CC/PP. The CC/PP may be term independent. In other words, the CC/PP may support all terms satisfying an RDF schema, not predetermined terms.

A UAProf created by the Wireless Access Protocol (WAP) Forum may also be used to describe features of a terminal. The UAProf is related to CC/PP, and is based on the RDF. The UAProf defines the following six components as shown in Table 1.

TABLE 1

| Components | Described information | Main Attributes |
|---|---|---|
| HardwarePlatform | Features of hardware | CPU, Screensize, Keyboard, Vendor, etc. |
| SoftwarePlatform | Operating Environment (OE) of device | CcppAccept, JavaPlatform, OSName, etc. |
| BrowserUA | HTML browser | BrowserName, DownloadableBrowserApps, etc. |
| NetworkCharacteristics | Features of network | SupportedBearers, SecuritySupport, etc. |
| WapCharacteristics | WAP features of device | WapVersion, WtaiLibraries, etc. |
| PushChracteristics | Push features of device | Push-Accept, Push-MsgSize, etc. |

WURFL, as an open source project, may collect information regarding a variety of wireless devices, may analyze features of the wireless devices, and may manage the analyzed features in XML document format. A WURFL XML document based on UAProf contains information regarding at least 7000 devices produced since 2006. WURFL aims to provide as many device features as possible, and to provide everyone around the world with information regarding the device features. Accordingly, WURFL may contain additional device features that are not described in UAProf. WURFL supports the concept of inheritance of device features. The concept of inheritance enables profiles of other devices to be extended, so that it is possible to easily prepare a profile of a new device.

The CC/PP, UAProf, and WURFL standards describe only features of a single terminal currently used by a user, regardless of whether the currently used terminal is connected to other content playback devices around the terminal.

Therefore, there is a demand for a method of describing a combined profile regarding a terminal and content playback devices around the terminal.

SUMMARY

Examples described herein provide a method of generating a combined profile of a terminal and devices around the terminal, and an apparatus to perform the method.

Additional features and utilities of the examples will be set forth in part in the description that follows and, in part, will be obvious from the description, or may be learned by practice of the concept set forth in the examples.

The foregoing and/or other features and utilities of the examples may be achieved by providing an apparatus to generate a combined profile of a terminal, the apparatus including a receiver to receive an input of content information, a search unit to search for a content playback device which supports a content corresponding to the content information among a plurality of content playback devices connected via a wired or wireless connection to the terminal, a collector to collect a profile of the content playback device found as a result of the searching, and a generator to generate the combined profile of the terminal and the found content playback device, based on the collected profile and a profile of the terminal.

The apparatus may further include a transmitter to transmit the combined profile to a server which provides the content.

The content information may include user preference information regarding the content, and the search unit may search for a content playback device corresponding to the user preference information among the plurality of content playback devices.

The apparatus may further include a transmitter to transmit a request message to the found content playback device, the request message requesting a profile of the found content playback device, and the receiver may receive the profile of the found content playback device from the found content playback device.

The apparatus may further include a database to store a profile of the found content playback device, and the collector may collect the profile of the found content playback device from the database.

The foregoing and/or other features and utilities of the examples may also be achieved by providing a method of generating a combined profile of a terminal, the method including receiving an input of content information, searching for a content playback device which supports a content corresponding to the content information among a plurality of content playback devices connected via a wired or wireless connection to the terminal, collecting a profile of the content playback device found as a result of the searching, and generating the combined profile of the terminal and the found content playback device, based on the collected profile and a profile of the terminal.

The method may further include transmitting the combined profile to a server which provides the content.

The content information may include user preference information regarding the content, and the searching may include searching for a content playback device corresponding to the user preference information among the plurality of content playback devices.

The collecting may include requesting the found content playback device to transmit a profile of the found content playback device, and receiving the profile of the found content playback device from the found content playback device.

The foregoing and/or other features and utilities of the examples may also be achieved by providing computer readable recording medium having recorded thereon a program to cause a computer to perform a method of generating a combined profile of a terminal, the method including receiving an input of content information, searching for a content playback device which supports a content corresponding to the content information among a plurality of content playback devices connected via a wired or wireless connection to the terminal, collecting a profile of the content playback device found as a result of the searching, and generating the combined profile of the terminal and the found content playback device, based on the collected profile and a profile of the terminal.

The foregoing and/or other features and utilities of the examples may also be achieved by providing a method of generating a combined profile of a terminal, the method including collecting a profile of one or more content playback devices connected to the terminal, and generating a combined profile of the terminal according to a profile of the terminal and the collected profile of the one or more content playback devices.

The method may further include searching for the one or more content playback devices according to content information.

The content information may be provided by a user of the terminal.

The method may further include storing the combined profile at the terminal.

The one or more content playback devices may be respectively connected to the terminal via a wired or wireless connection.

The method may further include transmitting the combined profile to a content provider along with a request for content.

Other features and aspects will be apparent from the following detailed description, the drawings, and the claims.

Figure 1:
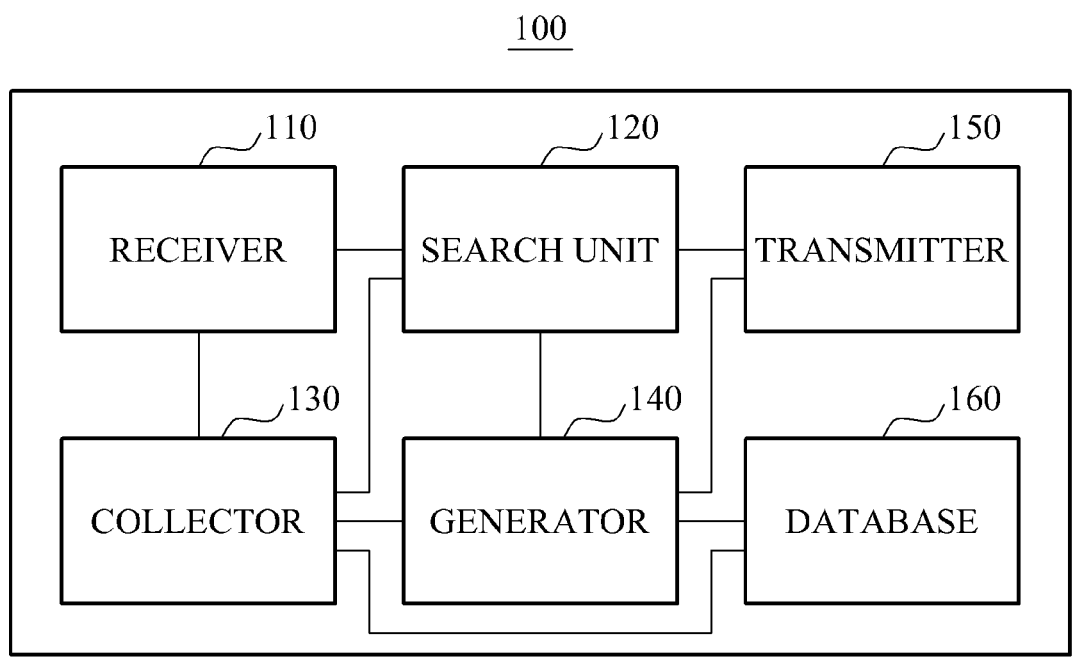
FIG. 1 is a block diagram illustrating a combined profile generation apparatus according to an example.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions may be omitted for increased clarity and conciseness.

FIG. 1 illustrates a combined profile generation apparatus 100 according to an example.

The combined profile generation apparatus 100 of FIG. 1 may generate a combined profile of a terminal, and may include a receiver 110, a search unit 120, a collector 130, and a generator 140.

According to various examples, the combined profile generation apparatus 100 may be installed as a module in a terminal, may be implemented as a separate device capable of being connected via a wired or wireless connection to the terminal, or other such configurations.

According to various examples, the terminal may be implemented as a mobile terminal enabling download of content from a content providing server via the Internet.

The receiver 110 may receive an input of content information. According to various examples, the receiver 110 may receive content information regarding content which a user desires to play back using a terminal or a content playback device connected via a wired or wireless connection to the terminal.

The content playback device may be implemented as any device enabling playback of content, for example, a TV, a video playback device, an audio playback device, a Portable Media Player (PMP), an MPEG Audio Layer-3 (MP3) device, a Bluetooth earphone, a Personal Digital Assistant (PDA), and the like.

The content information may be information regarding content which a user desires to play back. The content information may include, for example, information regarding a type of content (for example, video or audio), a size of content (for example, 10 Megabyte (MB), 2.5 Gigabyte (GB), etc.), and the like.

According to various examples, the content information may contain user preference information regarding content. The user preference information may be information regarding content desired by a user. For example, in a case in which a user of a terminal desires to play back a high-quality MP3 music file, he or she may enter "320 bitrate" as user preference information in a field contained in the content information indicating sound quality.

According to various examples, the user of the terminal may enter information regarding a predetermined content playback device as user preference information, to play back the desired content using the predetermined content playback device. For example, when the user of the terminal desires to play back content using a TV even though the terminal is able to play back the content, he or she may enter "TV" as user preference information.

The search unit 120 may search for a content playback device which supports content corresponding to the content information among a plurality of content playback devices connected via a wired or wireless connection to the terminal. In a case in which the content information contains user preference information, the search unit 120 may search for a content playback device corresponding to the user preference information, among the plurality of content playback devices.

For example, in a case in which content information received by the receiver 110 contains information regarding video content, the search unit 120 may search for a content playback device enabling playback of the video content, among the plurality of content playback devices.

The collector 130 may collect a profile of the content playback device which was found as a result of the searching. For example, in a case in which a notebook computer is found by the search unit 120, the collector 130 may collect a profile of the notebook computer. The profile of the notebook computer may include, for example, information regarding a type, a model name, a specification, a supportable file or files, and the like, with respect to the notebook computer.

The collector 130 may collect respective profiles of a plurality of content playback devices which were found as a result of the searching. For example, the collector 130 may collect a profile of the notebook computer described above and also any number of other found devices which enable the playback of the video content according to the received user preference information.

According to various examples, the combined profile generation apparatus 100 may further include a database 160 to store one or more profiles of any content playback devices found as a result of the searching by the search unit 120. In this instance, the collector 130 may collect the profile of the found content playback device from the database.

The generator 140 may generate a combined profile of the terminal and the found content playback device, based on the collected profile of the found content playback device and a profile of the terminal.

According to various examples, the combined profile generation apparatus 100 may further include a transmitter 150. The transmitter 150 may transmit the combined profile generated by the generator 140 to a content providing server.

According to various examples, a content playback device connected via a wired or wireless connection to the terminal may provide content to the terminal, instead of the content providing server providing the content. In this instance, the transmitter 150 may transmit the combined profile to the content playback device which provides the content.

According to various examples, the transmitter 150 may transmit a request message to a content playback device found as a result of the searching by the search unit 120, to request a profile of the found content playback device. In a case in which the found content playback device transmits the requested profile to the combined profile generation apparatus 100, the receiver 110 may receive the profile transmitted from the found content playback device.

Figure 2:
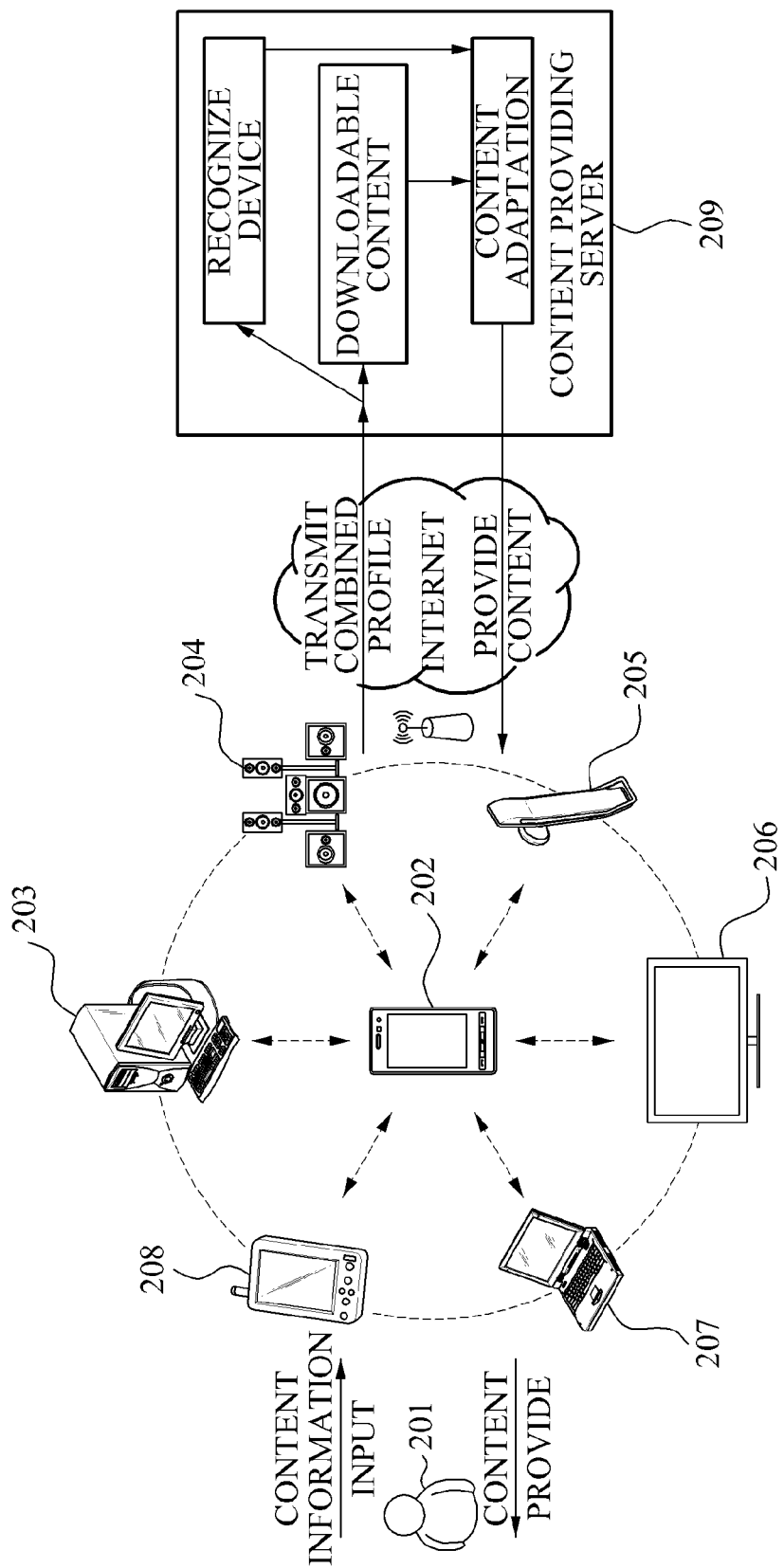
FIG. 2 is a diagram illustrating a combined profile generation apparatus according to another example.

FIG. 2 illustrates a combined profile generation apparatus according to another example.

In this example, the combined profile generation apparatus may be included as a module of a terminal 202. Referring to FIG. 2, the terminal 202 may receive an input of content information regarding a high-resolution image from a user 201 of the terminal 202.

The content information may include, for example, a title, a resolution, a file type, a size, a playback time, etc., with respect to the image. According to various examples, the user 201 may enter, for example, "1920×1080" as user preference information in a field contained in the content information indicating an image resolution.

A receiver of the combined profile generation apparatus may receive an input of the content information from the user 201.

A search unit of the combined profile generation apparatus may search for one or more content playback devices connected via a wired or wireless connection to the terminal 202. For example, the terminal 202 may be connected via a wired or wireless connection to a computer 203, an audio playback device 204, a Bluetooth earphone 205, a TV 206, a notebook computer 207, a PDA 208, and so on. Further, multiple ones of these types of devices may be connected via the wired or wireless connection.

The search unit may also search for a content playback device which supports playback of an image corresponding to the content information received by the receiver. For example, the search unit may search for a content playback device which supports playback of an image with a resolution higher than 1920×1080 corresponding to the user preference information contained in the content information. In such a case, the search unit may search for the computer 203, the TV 206, the notebook computer 207, and the PDA 208, as content playback devices enabling the playback of the image among the content playback devices around the terminal 202. In a case in which only the TV 206 is able to play back an image with a resolution higher than 1920×1080, the search unit may search for the TV 206 among the found content playback devices.

A collector of the combined profile generation apparatus may collect a profile of the TV 206 found as a result of the searching by the search unit. The profile of the TV 206 may include, for example, a type, a model name, a highest supportable resolution with respect to the TV 206, etc.

According to various examples, a transmitter of the combined profile generation apparatus may transmit to the TV 206 a request message to request the profile of the TV 206. In a case in which the TV 206 transmits the profile to the terminal 202 in response to the request message, the receiver of the combined profile generation apparatus may receive the profile of the TV 206.

According to various examples, the combined profile generation apparatus may further include a database. The database may store profiles of the computer 203, the audio playback device 204, the Bluetooth earphone 205, the TV 206, the notebook computer 207, the PDA 208, etc., which are connected via a wired or wireless connection to the terminal 202. In this instance, the collector may collect the profile of the TV 206 from the database.

A generator of the combined profile generation apparatus may generate a combined profile of the terminal 202 and the TV 206, based on the profile of the terminal 202 and the profile of the TV 206.

For example, in a case in which the highest resolution supported by the terminal 202 is 800×480, and the highest resolution supported by the TV 206 is 1920×1200, the generator may delete "800×480" from a field of a resolution contained in the profile of the terminal 202, and may input "1920×1200" in the field, so that a combined profile may be generated and the TV 206 may also play back a high-resolution image based on the combined profile. Also, the generator may input both "800×480" and "1920×1200" to generate a combined profile, so that the terminal 202 as well as the TV 206 may play back an image with the resolution of 1920×1200.

The combined profile generation apparatus may further include a transmitter to transmit the combined profile to a content providing server 209 via, for example, the Internet.

The content providing server 209 may recognize at least one of the terminal 202 and the content playback devices around the terminal 202, based on the combined profile received from the transmitter.

Also, the content providing server 209 may perform a content adaptation based on the combined profiled, so that content may be played back by the recognized device.

For example, the content providing server 209 may provide downloadable content corresponding to the combined profile. In a case in which only "1920×1200" is entered in a resolution field of the combined profile, the content providing server 209 may perform the content adaptation so that the downloadable content may be played back at a resolution of 1920×1200. Alternatively, when both "800× 480" and "1920×1200" are described in the resolution field of the combined profile, the content providing server 209 may perform the content adaptation so that the downloadable content may be played back at each of the resolutions of 800×480 and 1920×1200. According to various examples, the content providing server 209 may provide downloadable content that may be played back at the resolution of 800× 480, and downloadable content that may be played back at the resolution of 1920×1200.

In a case in which the content providing server 209 provides adaptable downloadable content, the terminal 202 may receive the adaptable downloadable content. The terminal 202 may transmit the received adaptable downloadable content to a device connected to the terminal 202 by a wired or wireless connection, such as the TV 206. The TV 206 may receive the adaptable downloadable content from the terminal 202, and may play back the received adaptable downloadable content. Accordingly, the user 201 may play back the adaptable downloadable content received by the terminal 202 as a high-resolution image using the TV 206.

Figure 3:
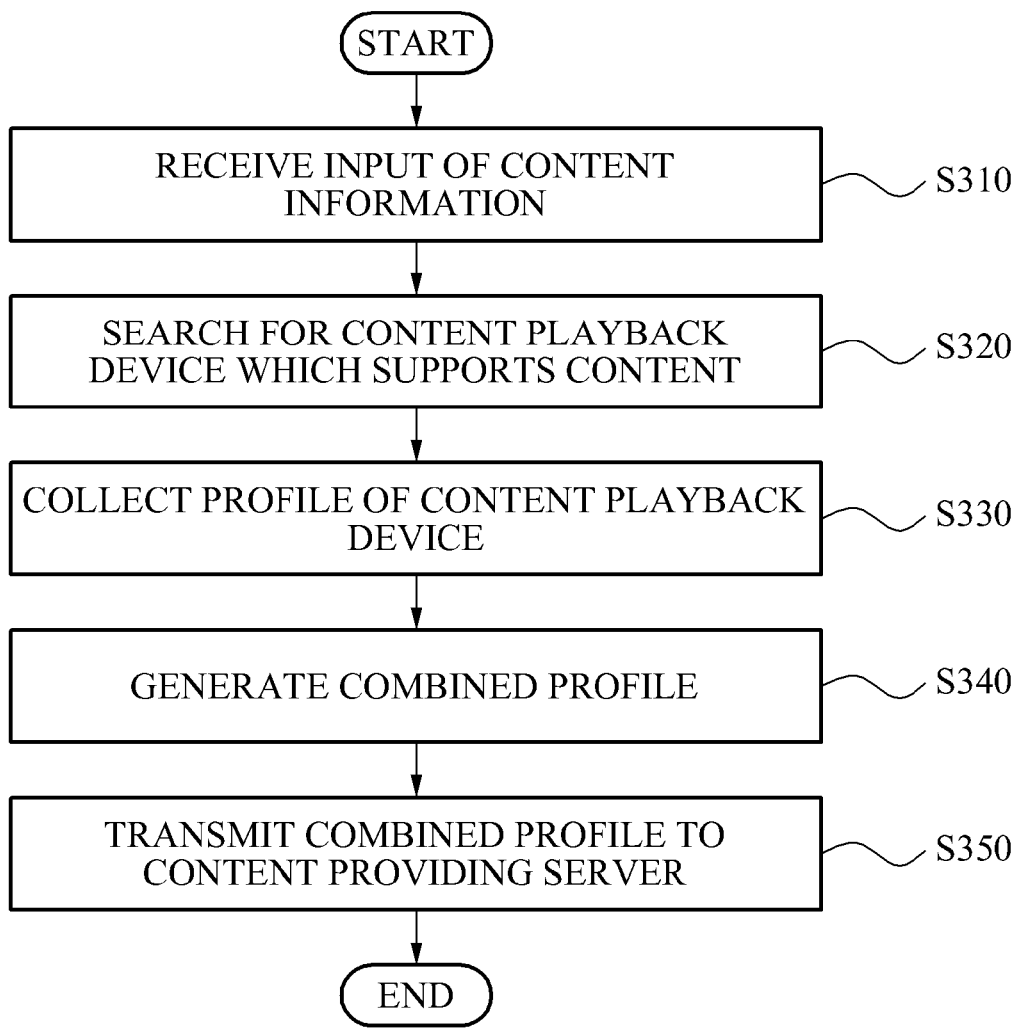
FIG. 3 is a flowchart illustrating a combined profile generation method according to an example.

FIG. 3 illustrates a flowchart of a combined profile generation method according to an example.

The combined profile generation method of FIG. 3 may be used to generate a combined profile of a terminal. Referring to FIG. 3, an input of content information may be received in operation S310.

Therefore, according to various examples, content information regarding content which a user desires to play back using a terminal or a content playback device may be received. Here, the content playback device may be connected via a wired or wireless connection to the terminal.

According to various examples, the content information may include, for example, information regarding a type of content, a size of content, etc. Also, the content information may contain user preference information regarding content. The user preference information may be information regarding content desired by a user.

A content playback device which supports content corresponding to the content information may be searched for among a plurality of content playback devices connected via a wired or wireless connection to the terminal in operation S320. In a case in which the content information contains user preference information, a content playback device corresponding to the user preference information may be searched for among the plurality of content playback devices.

A profile of the content playback device found as a result of the searching may be collected in operation S330.

A combined profile of the terminal and the found content playback device may be generated based on the collected profile of the found content playback device and a profile of the terminal in operation S340.

According to various examples, the combined profile generated in operation S340 may be transmitted to a content providing server which provides content in operation S350.

Figure 4:
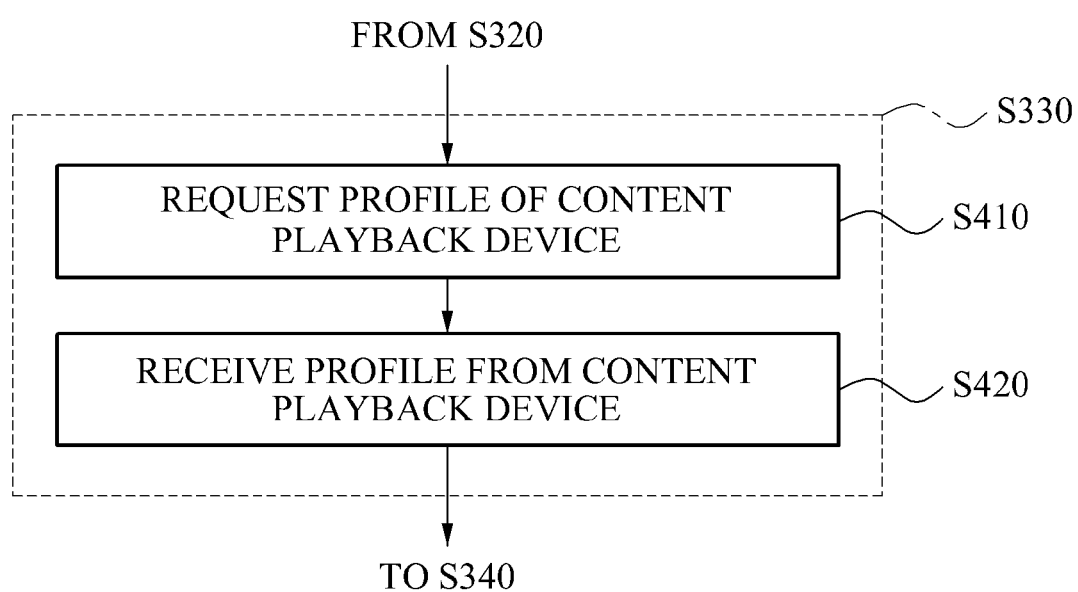
FIG. 4 is a flowchart illustrating an operation of collecting a profile of a content playback device according to an example.

FIG. 4 illustrates a flowchart illustrating an operation of collecting a profile of a content playback device according to an example.

Referring to FIG. 4, operation S330 may include requesting the content playback device found in operation S320 to transmit the profile corresponding to the content playback device in operation S410.

Also, operation S330 may include receiving the profile of the found content playback device from the found content playback device in operation S420.

The above-described examples may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media may include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although various examples have been illustrated and described, it will be appreciated by those skilled in the art that changes may be made in these examples, or other examples informed by this description, without departing from the principles and spirit of the examples, the scope of which is defined in the appended claims and their equivalents. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to generate a combined profile of a terminal, the apparatus comprising a processor, the processor comprising:
    a receiver configured to receive content information of content to be played back by a user of the terminal;
    a search unit configured to search for a content playback device, which meets the hardware requirement for playback of the content, among a plurality of content playback devices connected via a wired or wireless connection to the terminal after receiving the content information;
    a collector configured to collect a profile of the content playback device found as a result of the searching;
    a generator configured to generate the combined profile of the terminal and the found content playback device based on the collected profile and a profile of the terminal, so as to enable at least one of the terminal and the found content playback device to playback the content; and
    a transmitter configured to transmit the content to the found content playback device.

2. The apparatus of claim 1, further comprising a transmitter configured to transmit the combined profile to a server which provides the content to the apparatus.

3. The apparatus of claim 1, wherein:
    the content information comprises user preference information regarding the content, and
    the search unit searches for a content playback device corresponding to the user preference information among the plurality of content playback devices.

4. The apparatus of claim 1, wherein
    the transmitter is further configured to transmit a request message to the found content playback device, the request message requesting a profile of the found content playback device, and
    the receiver receives the profile of the found content playback device from the found content playback device.

5. The apparatus of claim 1, further comprising:
    a database configured to store a profile of the found content playback device, wherein
    the collector collects the profile of the found content playback device from the database.

6. The apparatus of claim 1, wherein the combined profile includes adaption information which is required to perform content adaptations for the terminal and the found content playback device on the content.

7. The apparatus of claim 6, wherein the adaption information includes at least one resolution which is supported by at least one of the terminal and found content playback device.

8. A method of generating a combined profile of a terminal, the method comprising:
    receiving, by a receiver, content information of content to be played back by a user of the terminal;
    searching, by a searcher, for a content playback device, which meets the hardware requirement for playback of the content, among a plurality of content playback devices connected via a wired or wireless connection to the terminal after receiving the content information;
    collecting, by a collector, a profile of the content playback device found as a result of the searching;
    generating, by a generator, the combined profile of the terminal and the found content playback device based on the collected profile and a profile of the terminal, so as to enable at least one of the terminal and the found content playback device to playback the content; and
    transmitting, by a transmitter, the content to the found content playback device.

9. The method of claim 8, further comprising transmitting the combined profile to a server which provides the content to the terminal.

10. The method of claim 8, wherein:
    the content information comprises user preference information regarding the content, and
    the searching comprises searching for a content playback device corresponding to the user preference information among the plurality of content playback devices.

11. The method of claim 8, wherein the collecting comprises:
    requesting the found content playback device to transmit a profile of the found content playback device; and
    receiving the profile of the found content playback device from the found content playback device.

12. The method of claim 8, wherein the combined profile includes adaption information which is required to perform content adaptations for the terminal and the found content playback device on the content.

13. The method of claim 12, wherein the adaption information includes at least one resolution which is supported by at least one of the terminal and found content playback device.

14. A non-transitory computer readable recording medium having recorded thereon a program to cause a computer to perform a method of generating a combined profile of a terminal, the method comprising:
    receiving content information of content to be played back by a user of the terminal;
    searching for a content playback device, which meets the hardware requirement for playback of the content, among a plurality of content playback devices connected via a wired or wireless connection to the terminal after receiving the content information;
    collecting a profile of the content playback device found as a result of the searching;
    generating the combined profile of the terminal and the found content playback device based on the collected profile and a profile of the terminal, so as to enable at least one of the terminal and the found content playback device to play back the content; and
    transmitting the content to the found content playback device.

* * * * *